US010086774B2

(12) United States Patent
Hawkins et al.

(10) Patent No.: US 10,086,774 B2
(45) Date of Patent: Oct. 2, 2018

(54) ROTARY CHAIN RACK FOR RECOVERY VEHICLES

(71) Applicants: John Hawkins, Hixson, TN (US); Scott Cavanaugh, Antioch, TN (US)

(72) Inventors: John Hawkins, Hixson, TN (US); Scott Cavanaugh, Antioch, TN (US)

(73) Assignee: Miller Industries Towing Equipment, Inc., Ooltewah, TN (US)

( * ) Notice: Subject to any disclaimer, the term of this patent is extended or adjusted under 35 U.S.C. 154(b) by 842 days.

(21) Appl. No.: 14/539,119

(22) Filed: Nov. 12, 2014

(65) Prior Publication Data
US 2016/0129852 A1    May 12, 2016

(51) Int. Cl.
*B60R 11/06* (2006.01)
*A47B 49/00* (2006.01)
*B60R 11/00* (2006.01)

(52) U.S. Cl.
CPC ............ *B60R 11/06* (2013.01); *A47B 49/004* (2013.01); *B60R 2011/004* (2013.01); *B60R 2011/0085* (2013.01)

(58) Field of Classification Search
CPC ............ B60R 11/06; B60R 2011/0085; B60R 2011/004; A47F 7/005; A47F 5/02; A47B 49/004
USPC ....................................................... 211/163
See application file for complete search history.

(56) References Cited

U.S. PATENT DOCUMENTS

| 505,320 | A | * | 9/1893 | Meadows | ............ | A47B 81/005 211/4 |
| 953,205 | A | * | 3/1910 | Hughes | .................. | A47B 49/00 108/105 |
| 1,586,826 | A | * | 6/1926 | Michelbach | ............ | A47F 7/175 211/163 |
| 2,526,245 | A | * | 10/1950 | Lathrop | ................. | A47B 49/00 108/139 |
| 2,972,420 | A | * | 2/1961 | Tucci | ........................ | A47F 5/02 211/163 |
| 3,065,857 | A | * | 11/1962 | Sanders | ................ | F17C 13/084 211/85.19 |
| 3,319,800 | A | * | 5/1967 | Bowles | ................... | A47F 7/024 211/163 |
| 3,807,788 | A | * | 4/1974 | Radek | ....................... | A47F 5/02 211/131.1 |
| 3,826,378 | A | * | 7/1974 | Novak | ................. | A47B 49/004 211/166 |
| 3,981,405 | A | * | 9/1976 | Slack | ........................ | A47F 5/02 211/163 |
| 4,056,194 | A | * | 11/1977 | Radek | ....................... | A47F 5/02 211/131.1 |
| 4,899,968 | A | * | 2/1990 | Eaglin | ....................... | A47F 5/02 211/78 |
| 5,074,421 | A | * | 12/1991 | Coulter | ..................... | A47F 5/02 211/163 |

(Continued)

OTHER PUBLICATIONS

Jerr-Dan Chains Photograph, 2014.
Jerr-Dan Tool & Rigging Kits Photograph, 2014.

*Primary Examiner* — Stanton L Krycinski
(74) *Attorney, Agent, or Firm* — Michael P. Mazza, LLC

(57) ABSTRACT

A rotary chain rack located on a vehicle used to recover disabled vehicles, which may include a lower bin, one or more upper rotating carousels to which hooks carrying chains may be mounted, and a braking device for automatically stopping the rotation of the chain rack.

13 Claims, 5 Drawing Sheets

(56) References Cited

U.S. PATENT DOCUMENTS

| | | | | |
|---|---|---|---|---|
| 5,397,005 | A | * | 3/1995 | Taccolini .............. A47F 7/0021 211/163 |
| 5,676,261 | A | * | 10/1997 | Baughman ........... A47B 49/004 211/163 |
| 6,868,975 | B2 | * | 3/2005 | Sells ...................... A47B 49/00 211/163 |
| 7,748,545 | B2 | * | 7/2010 | Johnson ................ F17C 13/084 211/163 |
| 9,434,321 | B2 | | 9/2016 | Perron et al. |

* cited by examiner

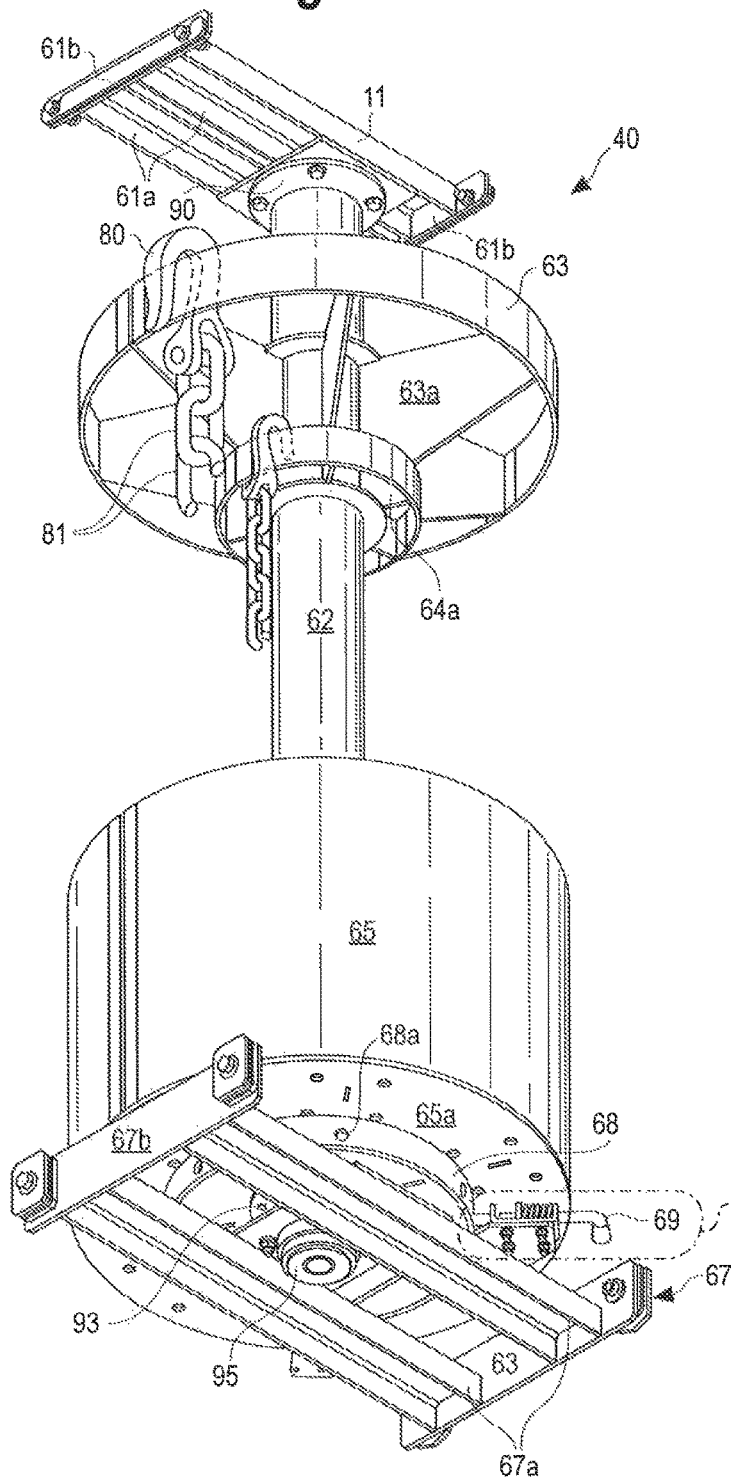
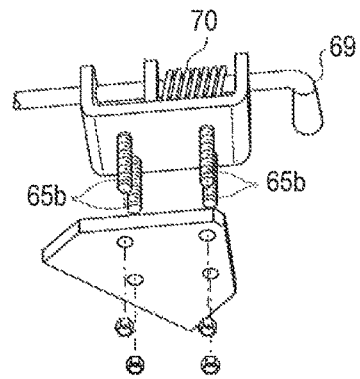
Fig. 4
Fig. 5

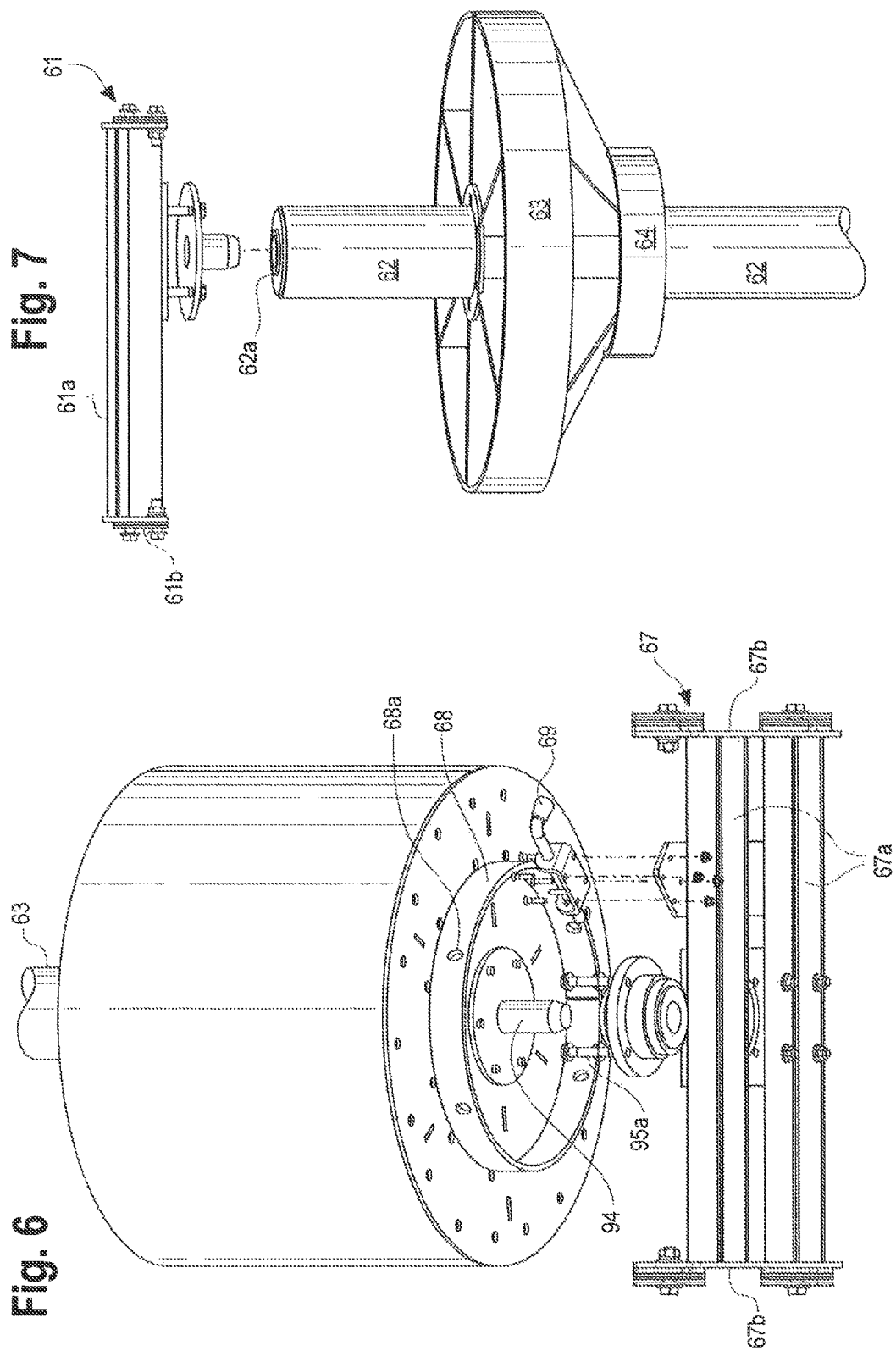

ROTARY CHAIN RACK FOR RECOVERY VEHICLES

BACKGROUND OF THE INVENTION

The present invention generally relates to recovery vehicles and, more particularly, to devices for storing accessories such as chains and chain hooks, located on recovery vehicles.

It would be useful to provide a location in a recovery vehicle, such as within one of its tool boxes, to store tow accessories such as hooks and chains. It would also be convenient to be able to store differently-sized hooks and chains in different locations, and to present them to the operator in a manner which renders their selection or replacement relatively easy and efficient. It would also be advantageous to provide a way to safely and securely transport the rotary chain rack during vehicle movement.

SUMMARY OF THE INVENTION

The objects mentioned above, as well as other objects, are solved by the present invention, which overcomes disadvantages of prior storage devices for recovery vehicles, while providing new advantages not previously associated with them.

In a preferred embodiment, a rotary chain rack may be located on a vehicle used to recover disabled vehicles. The rotary chain rack may include a main post capable of rotation, one or more carousels attached to and rotating with the main post, and a braking device for automatically stopping the rotation of the main post. The carousels may be adapted to carry hooks attached to chains, and differently-sized carousels may be adapted to carry differently-sized hook-and-chain combinations. The carousels may be separated by radially-extending partitions into carousel compartments.

The braking device may be of varying forms, such as a spring-loaded brake lock, a ratchet mechanism, or a frictional braking mechanism such as a spring-loaded braking disc pad. As one example, the braking device may include a locking ring with apertures, located adjacent the brake lock. The locking ring may be stationary, and the locking brake may be permitted to rotate synchronously with the main post. The braking device may allow controlled rotation and stoppage of the rack.

A lower drum or storage bin may also be provided for receiving a lower portion of the chains. Preferably, the bin rotates with and about the main post, and may be welded to the main post. The drum/storage bin may be separated by radially-extending partitions into bin compartments. Upper and lower supports may be used to support and maintain the main post in position. Waterproof, self-lubricating bearings may be used to interconnect the main post with the upper and lower supports.

In one preferred embodiment, the recovery vehicle includes a tunnel or saddle box with one or more tool boxes, and one or more rotary chain racks may be secured within one or more of the tool boxes.

In one preferred embodiment, two or more carousels, welded to and rotating with the main post, may be provided. Each carousel may be of the same or of a different size, to accommodate differently-sized hook-and-chain combinations, for example. As one non-limiting example, an upper carousel and a lower carousel may be provided, with the upper carousel having a larger circumference than the lower carousel. Hooks and chains mounted to the upper carousel, for example, may have a different size than hooks and chains mounted to the lower carousel.

A method for using a rotary chain rack carried by a recovery vehicle also forms a part of the present invention. The rotary chain rack has a main post capable of rotation. One or more carousels may be attached to and rotate with the main post, and may be adapted to carry hooks attached to chains. A braking device may be provided for automatically stopping the rotation of the main post and/or for allowing controlled rotation of the main post. The main post, with the attached carousels carrying the chains, may be selectively rotated by an operator, allowing the operator to select one or more chains, or to mount one or more chains on the carousels. The braking device may be used to selectively lock the main post against further rotation.

Definition of Claim Terms

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 4 is a bottom and side perspective view of the rotary chain rack embodiment shown in FIG. 3;

FIG. 5 is an enlarged perspective view of the spring-loaded braking pin shown in FIG. 4;

FIG. 6 is an enlarged bottom and side perspective view of a lower portion of the rotary chain rack shown in FIGS. 3-4; and FIG. 7 is an enlarged top and side perspective view of an upper portion of the rotary chain rack shown in FIGS. 3-4.

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
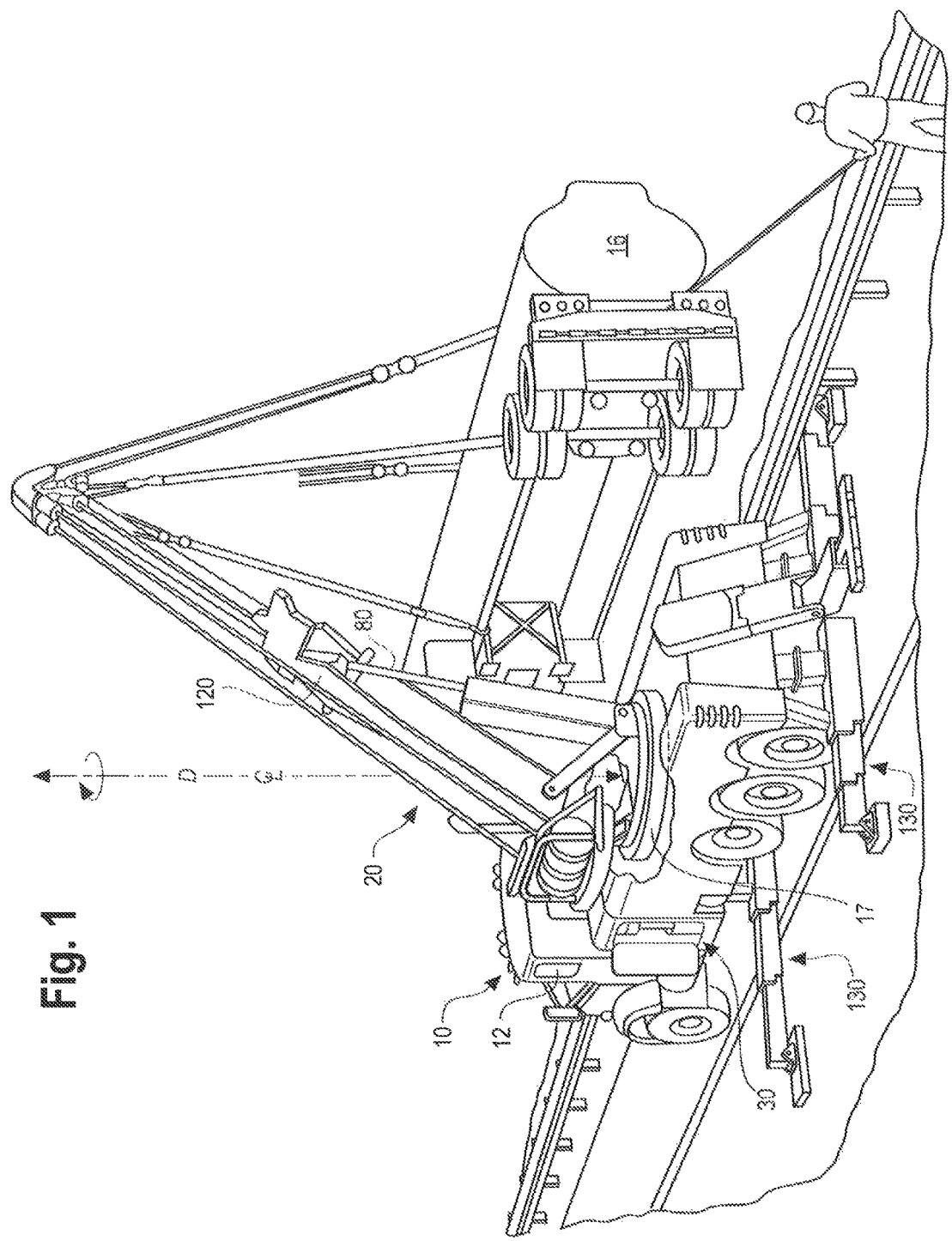
FIG. 1 is a top and side perspective view of a rotating wrecker with a travel base assembly supporting the boom which may be moved along the longitudinal axis of the wrecker.

Referring first to FIG. 1, rotating wrecker 10 includes a boom assembly 20 mounted on rotating bearing 17, which may in turn be mounted on a travel base assembly which can move along the longitudinal axis of the rotating wrecker. Boom lift cylinder 60 raises and lowers boom 120, which may be extended or retracted by telescoping cylinders (not shown). Extendible stabilizing legs 130 may be used to stabilize the wrecker during recovery operations. Wrecker 10 may be used, for example, to move a load such as tanker 16 from a position adjacent a side of the wrecker to an alternate position such as to the rear of the wrecker.

Figure 2:
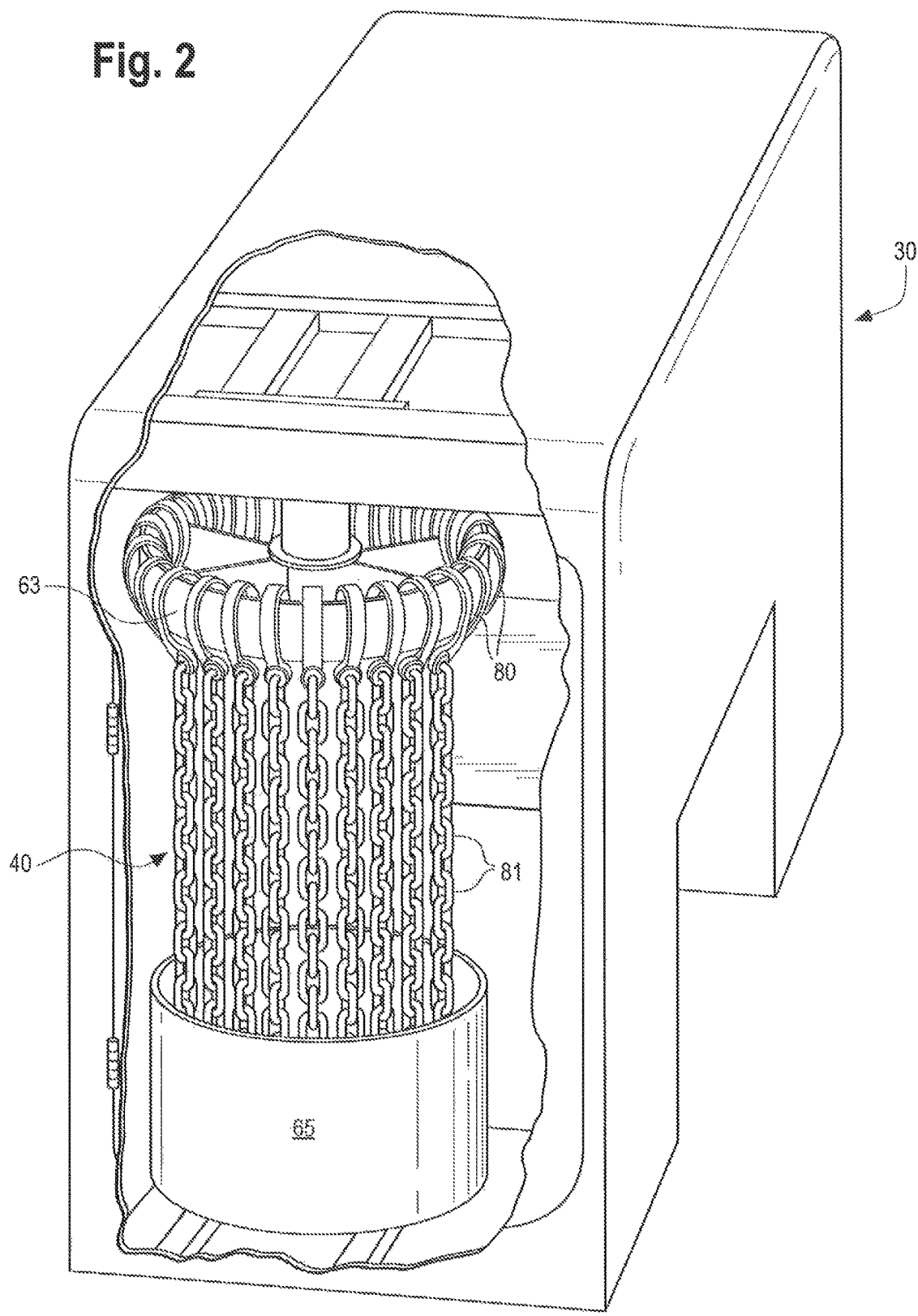
FIG. 2 is a top and side perspective view of a tunnel box located on the wrecker and rear of the cab, which may house one or more rotary chain racks according to a preferred embodiment of the invention.

Referring to FIGS. 1 and 2, wrecker 10 may include various tool boxes, such as a "tunnel box" 30 with storage compartments 30a located on opposing sides of the wrecker linked by overhanging compartment 30b and adjacent the rear of the cab 12. Tunnel box or saddle box 30 may be suitably attached to the wrecker, such as by being bolted to the floor/chassis and roof/carriage of the wrecker. Storage compartments 30 may be used to store various accessory items used by the wrecker operator, including such items as chains, chain hooks and bridles. Referring to FIG. 2, a rotary chain rack 40 may be securely attached to tool box 30, such as by bolting the upper and lower supports 61, 67 (consisting of struts 61a, 61b and 67a, 67b, respectively) of the rack to the tool box floor and ceiling surfaces, respectively. Main post 62 may be rigidly secured to these supports in a vertical orientation, such as by using bolts 62a (FIG. 4). Rotary chain racks 40 may be provided in each compartment 30b, or in only one of such compartments, as desired.

Figure 3:
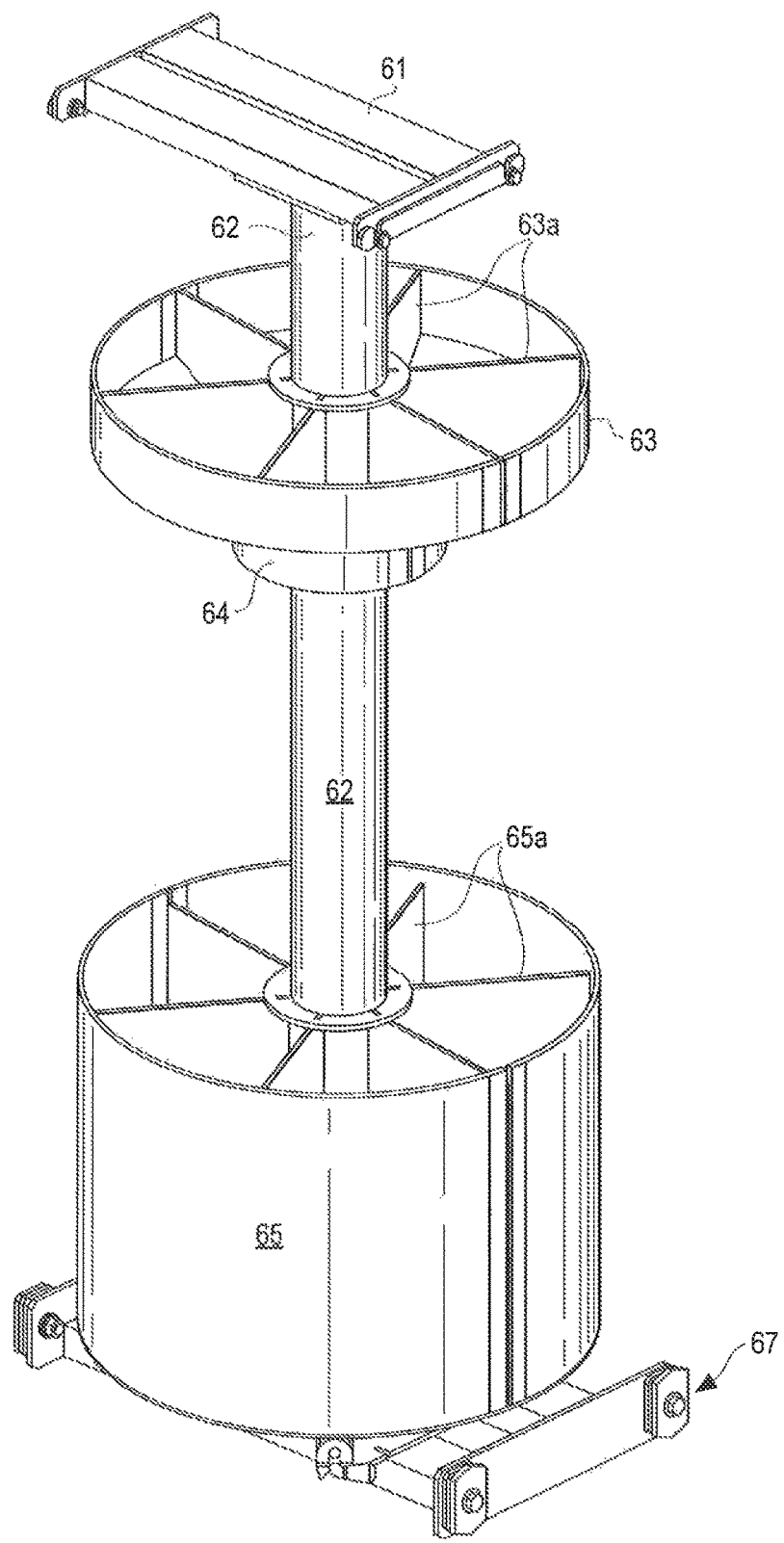
FIG. 3 is a top and side perspective view of a preferred embodiment of a rotary chain rack of the present invention.

Referring to FIGS. 3 and 4, upper and lower carousels 63, 64 may be located at fixed heights along main post 62 as shown and allowed to rotate about main post 62. Drum 65 may be mounted for rotation on rotating locking ring 68, which may include ring apertures 68a (such as 8 in number) evenly spaced about ring 68. Spring-loaded brake pin 69 may be rigidly mounted to drum base 65a, adjacent locking ring 68, using fasteners 65b (FIG. 5). The spring-loaded pin assembly may consist of a Boniface BTSPR-001, for example, available from Boniface Engineering Ltd. of Norfolk, England. The spring may provide a latching force, for example, of about 10 pounds, to ensure that brake pin 69 limits the rotation of the drum by latching into the next available ring aperture 68a after the spring is released or actuated. Pin 69 preferably can be held manually in check, allowing desired drum rotation, before being released and allowing pin 69 to lock into the next available ring aperture 68a, in an alternative embodiment, the spring could be removed; however, this is not preferred, as during wrecker transport, if the brake pin is not engaged, drum rotation could be continuous. For enhanced stability, as well as to allow differently-sized chains/hooks to be separately compartmentalized, the carousels and drum may be provided with partitions 63a, 64a, 65a, respectively.

Referring to FIG. 6, bottom bearing 95, resting on and rigidly attached to bottom support 67 using fasteners 95a, supports pin 94 rigidly fastened to the bottom of main post 62. Bearing 95 is preferably a waterproof, self-lubricating bearing such as the Royersford 20-06-0106 bearing, available from Royersford Foundry and Machine Co, Inc, of Phoenixville, Pa. Plate 93 may be rigidly attached to the bottom of locking ring 68 using fasteners 93a, ensuring that downwardly-extending pin 94 (forming a part of or attached to plate 93) remains firmly in position. Main post/tube 62, carousels 63, 64 and drum/bin 65 may be all welded together and rotate together.

Referring to FIG. 7, the top of main post 62 may have a top bearing/bushing 62a attached to it, such as a self-lubricating, waterproof, IGUS JFI-242846 Iglide® plastic bushing, available from Igus Inc. of East Providence, R.I. Plate 90 may be rigidly fastened (using fasteners 90a) to top support 61. Downwardly-extending pin 91 (forming a part of or attached to plate 90) engages with bushing 62a, enabling main post 62 to rotate about pin 91.

In operation, chain hooks 80 attached to chains 81 may be mounted on carousels 63, 64 as shown in FIG. 2. Differently sized hooks and chains may be located on upper carousel 63 (which may accommodate larger hooks and chains, for example), as opposed to lower carousel 64 (which may accommodate smaller hooks and chains, for example). Additionally, different sizes may be arranged, if desired, in each compartment of a carousel formed by its respective partitions.

Given disparate chain arrangements about the circumference of the carousels, the load on the carousels may not be evenly distributed, inducing rotation of the carousels, particularly when the wrecker is moving. To protect the operator, and to limit movement of heavy chains during transport, spring-loaded braking pin 69 may be provided. Normally, the end of pin 69 will be induced by spring 70 to move within a locking ring aperture 68a, locking movement of drum 65, main post 62 and carousels 63, 64. When the operator desires to rotate the chain rack, pin 69 is pulled, releasing it from an aperture. Once released, the pin will lock into the next available slot/aperture if the carousels, main post and drum are rotated by any means (whether by the operator's manual intervention, or by being induced to rotate by uneven load distribution and/or wrecker movement).

It should be emphasized that as many hundreds of pounds of chains may be carried by the rotary chain of the present invention, the chain rack and braking mechanism(s) should have a robust design adequate to support such potentially unbalanced and unevenly distributed loads.

Ordinary artisans will appreciate that rotary chain rack 40 may be mounted inside of large tool boxes, such as those mounted along the sides of recovery vehicles such as wreckers. Upper and lower supports 61, 67 may have a different shape and size to accommodate differently-sized tool boxes on different recovery vehicles and/or to be retrofitted to the existing structure of a tool box. Only a single carousel, or more than two carousels, with no partitions or a different number than those shown, may be used as desired for a given application.

Ordinary artisans will also appreciate that there are a variety of other ways to automatically stop the drunk post-carousels weldment from rotating. For example, the locking pin could be oriented vertically rather than horizontally. Alternatively, instead of a locking pin, a ratchet mechanism could be used that springs into a recess or receiver. In still other alternative embodiments, a spring-loaded lever could be enabled to load into a groove or recess, or a frictional braking mechanism could be used, such as a spring-loaded braking disc pad, with an unlatching mechanism to allow the rack to freely rotate when desired. A frictional braking mechanism could be particularly well suited to allow controlled rotation and stoppage of the rotating weldment. Controlled rotation and slowing of the rotating weldment can be important, as heavy, unbalanced chains unevenly distributed about the chain rack can otherwise cause the rack to potentially spin in an uncontrolled fashion. In short, the locking mechanism may be mechanical and/or frictional in nature but preferably retains the feature of being self-locking to prevent excessive free rotation in an unattended state.

The above description is not intended to limit the meaning of the words used in the following claims that define the invention. Persons of ordinary skill in the art will understand that a variety of other designs still failing within the scope of the following claims may be envisioned and used. For example, while preferred embodiments involving a rotating wrecker, have been disclosed, in other embodiments the rotary chain rack invention may be employed inside tool boxes of other recovery vehicles, or attached directly to the outside of a recovery vehicle without being located within a tool box. It is contemplated that these addition al examples, as well as future modifications in structure, function, or result to that disclosed here, will exist that are not substantial changes to what is claimed here, and that all such insubstantial changes in what is claimed are intended to be covered by the claims.

We claim:

1. A rotary chain rack located on a recovery vehicle used to recover disabled vehicles, comprising:
   a main post supported by a chassis of the recovery vehicle, the main post being capable of rotation;
   at least upper and lower carousels attached to and configured to rotate with the main post, wherein the upper carousel has a larger circumference than the lower carousel, the upper and lower carousels adapted to carry hooks attached to chains, wherein the chains are useable in a vehicle recovery operation, and wherein the hooks and chains include larger and smaller hooks and chains, and wherein the larger hooks and chains are mounted to the upper carousel, and the smaller hooks and chains are mounted to the lower carousel;
   a lower bin located below the upper and lower carousels, the bin being adapted to receive and support a lower portion of the chains;
   a braking device located on or adjacent the lower bin, the braking device being adapted to automatically stop the rotation of the main post.

2. The rotary chain rack of claim 1, wherein the braking device permits controlled rotation of the main post.

3. The rotary chain rack of claim 1, wherein the braking device comprises a spring-loaded brake lock.

4. The rotary chain rack of claim 3, wherein the braking device further comprises a locking ring with apertures, located adjacent the brake lock, and wherein the locking ring is fixed in position and does not rotate, and the brake lock rotates synchronously with the main post.

5. The rotary chain rack of claim 1, wherein the recovery vehicle includes a tool box, and the rotary chain rack is secured within the tool box.

6. The rotary chain rack of claim 1, wherein the bin rotates about the main post.

7. The rotary chain rack of claim 1, wherein the bin is welded to the main post.

8. The rotary chain rack of claim 1, wherein the bin is separated by radially-extending partitions, into bin compartments.

9. The rotary chain rack of claim 1, wherein the upper and lower carousels are each separated by radially-extending partitions into carousel compartments.

10. The rotary chain rack of claim 8, wherein the upper and lower carousels are each separated by radial partitions into carousel compartments, and the hooks and chains are mounted or arranged in a particular carousel compartment and extend into a corresponding one of the bin compartments.

11. The rotary chain rack of claim 1, further comprising upper and lower supports for supporting and maintaining the main post in position.

12. The rotary chain rack of claim 11, further comprising waterproof, self-lubricating bearings interconnecting the main post with the upper and lower supports.

13. The rotary chain rack of claim 1, wherein the braking device comprises a locking ring with apertures, located adjacent a brake lock.

* * * * *